(12) United States Patent
Hindy et al.

(10) Patent No.: US 12,445,176 B2
(45) Date of Patent: *Oct. 14, 2025

(54) TYPE-II PORT-SELECTION CODEBOOK GENERATION

(71) Applicant: Lenovo (Singapore) PTE. LTD., New Tech Park (SG)

(72) Inventors: Ahmed Hindy, Aurora, IL (US); Udar Mittal, Rolling Meadows, IL (US); Tyler Brown, Lake Zurich, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,516

(22) Filed: Oct. 6, 2023

(65) Prior Publication Data
US 2024/0048195 A1  Feb. 8, 2024

Related U.S. Application Data

(63) Continuation of application No. 17/905,711, filed as application No. PCT/IB2021/051885 on Mar. 6, 2021.
(Continued)

(51) Int. Cl.
*H04L 12/00* (2006.01)
*H04B 7/0456* (2017.01)
(Continued)

(52) U.S. Cl.
CPC ......... *H04B 7/0456* (2013.01); *H04B 7/0617* (2013.01); *H04B 7/0626* (2013.01); *H04L 5/0051* (2013.01)

(58) Field of Classification Search
CPC .. H04B 7/0456; H04B 7/0617; H04B 7/0626; H04B 7/0478; H04B 7/0632; H04B 7/0663; H04B 7/0639; H04L 5/0051
(Continued)

(56) References Cited

U.S. PATENT DOCUMENTS 10,321,411 B2  6/2019  Ouchi et al.
10,454,640 B2  10/2019  Wang et al.
(Continued)

FOREIGN PATENT DOCUMENTS

| EP | 3672100 A1 * | 6/2020 | ........... H04B 7/0417 |
| EP | 3780456 A1 * | 2/2021 | ........... H04B 7/0456 |
| KR | 20190120372 A * | 10/2019 | ........... H04B 7/0417 |

OTHER PUBLICATIONS

Samsung, "New WID: Further enhancements on MIMO for NR", 3GPP TSG RAN Meeting #86 RP-193133, Dec. 9-12, 2019, pp. 1-5.
(Continued)

*Primary Examiner* — Frantz Coby
(74) *Attorney, Agent, or Firm* — Kunzler Bean & Adamson

(57) ABSTRACT

Various aspects of the present disclosure relate to Type-II port-selection codebook generation. The method and apparatuses described herein may include a means for receiving a set of CSI reference signals and identifying a set of ports based on the set of reference signals. The method and apparatuses described herein may include a means for selecting a subset of ports from the identified set of ports and for generating a set of amplitude coefficient indicators and a set of phase coefficient indicators corresponding to the subset of ports. The method and apparatuses described herein may include a means for generating a CSI report comprising an indication of the subset of ports, the set of amplitude coefficient indicators, and the set of phase coefficient indicators, where the indication of the subset of ports comprises a combinatoric value.

20 Claims, 10 Drawing Sheets

Related U.S. Application Data

(60) Provisional application No. 62/986,601, filed on Mar. 6, 2020.

(51) Int. Cl.
*H04B 7/06* (2006.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 10,673,507 | B2 | 6/2020 | Onggosanusi et al. |
| 10,779,247 | B2 | 9/2020 | Imamura et al. |
| 10,819,563 | B2 * | 10/2020 | Pani ........................ H04L 45/28 |
| 11,336,419 | B2 | 5/2022 | Wang et al. |
| 11,515,924 | B2 * | 11/2022 | Davydov ............ H04W 74/002 |
| 2016/0142117 | A1 * | 5/2016 | Rahman ............... H04B 7/0486 |
| | | | 375/267 |
| 2019/0007106 | A1 * | 1/2019 | Park ...................... H04B 7/0456 |
| 2019/0229791 | A1 | 7/2019 | Song et al. |
| 2019/0260434 | A1 * | 8/2019 | Park ...................... H04B 7/0479 |
| 2023/0379028 | A1 | 11/2023 | Gao et al. |

OTHER PUBLICATIONS

3GPP, 3rd Generation Partnership Project; Technical Specification Group Radio Access Network; NR; Physical layer procedures for data (Release 16), 3GPP TS 38.214 V16.0.0, Dec. 2019, p. 1-59.
U.S. Appl. No. 17/905,711, Office Action Summary, USPTO, Oct. 22, 2024, pp. 1-22.

* cited by examiner

FIG. 3

$$h_{SR,R}^{UL}(n) h_{SR}^{UL}(n) = \sum_{p=0}^{P_{UL}-1} g_p^{UL} e^{j2\pi n \Delta f \tau_p + j2\pi \kappa_1 \frac{F_c d_1^i}{c}\sin\theta_p^i \sin\phi_p^i + j2\pi \kappa_2 \frac{F_c d_2^i}{c}\cos\theta_p^i + j2\pi \kappa_1 \frac{F_c d_1^i}{c}\cos\theta_p \cos\phi_p}$$
$$+ \sum_{p=P_{UL}}^{P-1} g_p^{UL} e^{j2\pi n \Delta f \tau_p + j2\pi \kappa_1 \frac{F_c d_1^i}{c}\sin\theta_p^r \sin\phi_p^r + j2\pi \kappa_2 \frac{F_c d_2^i}{c}\cos\theta_p^r + j2\pi \kappa_1 \frac{F_c d_1^i}{c}\cos\theta_p \cos\phi_p}$$

300

$$y_{k,u}^{DL}(n) = \frac{1}{N_1 N_2} \sum_{s=0}^{N_1 N_2 - 1} h_{u,s}^{DL}(n) \dot{G}_{(s,k)}(n) + z_{k,u}(n)$$

$$= \alpha_k^{DL} e^{j2\pi \psi_{k,u}^{DL}}$$

$$+ \frac{1}{N_1 N_2} \sum_{s=0}^{N_1 N_2 - 1} \sum_{\substack{p=0, p \neq k}}^{P_{UL}-1} \alpha_p^{DL} e^{j2\pi \left( \psi_p^{DL} + (\Delta F + n\Delta f)(\tau_p - \tau_k) + s_1 \frac{(F_c + \Delta F) d_1}{c} (\sin\theta_p \sin\varphi_p - \sin\theta_k \sin\varphi_k) + s_2 \frac{(F_c + \Delta F) d_2}{c} (\cos\theta_p - \cos\theta_k) \right)}$$

$$+ \frac{1}{N_1 N_2} \sum_{s=0}^{N_1 N_2 - 1} \sum_{p'=P_{UL}}^{P_{DL}-1} \alpha_{p'}^{DL} e^{j2\pi \left( \psi_{p'}^{DL} + (\Delta F + n\Delta f)(\tau_{p'} - \tau_k) + s_1 \frac{(F_c + \Delta F) d_1}{c} (\sin\theta_{p'} \sin\varphi_{p'} - \sin\theta_k \sin\varphi_k) + s_2 \frac{(F_c + \Delta F) d_2}{c} (\cos\theta_{p'} - \cos\theta_k) \right)}$$

$$+ \frac{1}{N_1 N_2} \sum_{s=0}^{N_1 N_2 - 1} e_{u,s}^{DL}(n) \cdot e^{-j2\pi \left( (\Delta F + n\Delta f)\tau_k + s_1 \frac{(F_c + \Delta F) d_1}{c} \sin\theta_k \sin\varphi_k + s_2 \frac{(F_c + \Delta F) d_2}{c} \cos\theta_k \right)} + z_{k,u}(n)$$

$$y_{k,s}^{DL}(n) = \frac{1}{N_1 N_2} \sum_{s=0}^{N_1 N_2 - 1} h_{k,s}^{DL}(n) \tilde{G}_{s,k,s}^{DL}(n) + z_{k,s}(n)$$

$$= a_k^{DL} e^{j2\pi\left(\psi_k^{DL} + (\Delta F + n\Delta f)(\tau_k^{DL} - \tau_k^{UL})\right)} \sum_{s=0}^{N_1 N_2 - 1} e^{j2\pi\left(\frac{(F_c + \Delta F)d_1}{c}(\sin\theta_k^{DL}\sin\phi_k^{DL} - \sin\theta_k^{UL}\sin\phi_k^{UL}) + \frac{(F_c + \Delta F)d_2}{c}(\cos\theta_k^{DL} - \cos\theta_k^{UL})\right)}$$

$$+ \frac{1}{N_1 N_2} \sum_{s=0}^{N_1 N_2 - 1} \sum_{\substack{p=0 \\ p \neq p_k^{DL}}}^{P_{UL}-1} a_p^{DL} e^{j2\pi\left(\psi_k^{DL} + (\Delta F + n\Delta f)\tau_p^{DL} + s_1 \frac{(F_c + \Delta F)d_1}{c}\sin\theta_p^{DL}\sin\phi_p^{DL} - \sin\theta_k^{UL}\sin\phi_k^{UL}) + s_2 \frac{(F_c + \Delta F)d_2}{c}(\cos\theta_p^{DL} - \cos\theta_k^{UL})\right)}$$

$$+ \frac{1}{N_1 N_2} \sum_{s=0}^{N_1 N_2 - 1} \sum_{\substack{p=0 \\ p \neq p_k^{DL}}}^{P_{UL}-1} a_p^{DL} e^{j2\pi\left(\psi_k^{DL} + (\Delta F + n\Delta f)(\tau_p^{DL} - \tau_k^{UL}) + s_1 \frac{(F_c + \Delta F)d_1}{c}(\sin\theta_p^{DL}\sin\phi_p^{DL} - \sin\theta_k^{UL}\sin\phi_k^{UL}) + s_2 \frac{(F_c + \Delta F)d_2}{c}(\cos\theta_p^{DL} - \cos\theta_k^{UL})\right)}$$

$$+ \frac{1}{N_1 N_2} \sum_{s=0}^{N_1 N_2 - 1} e_{k,s}^{DL}(n) \cdot e^{-j2\pi\left((\Delta F + n\Delta f)\tau_k + s_1 \frac{(F_c + \Delta F)d_1}{c}\sin\theta_k^{UL}\sin\phi_k^{UL} + s_2 \frac{(F_c + \Delta F)d_2}{c}\cos\theta_k^{UL}\right)} + z_{k,s}(n)$$

FIG. 5

TYPE-II PORT-SELECTION CODEBOOK GENERATION

CROSS-REFERENCE TO RELATED APPLICATIONS

This application claims priority to U.S. Provisional Patent Application No. 62/986,601 entitled "EXPLOITING CHANNEL CORRELATION FOR TYPE-II CODEBOOK" and filed on Mar. 6, 2020 for Ahmed Hindy, Udar Mittal, and Tyler Brown, which application is incorporated herein by reference.

FIELD

The subject matter disclosed herein relates generally to wireless communications and more particularly relates to configurations for exploiting channel correlation for further-enhanced Type-II codebook.

BACKGROUND

For Third Generation Partnership Project ("3GPP") New Radio ("NR") Release 16 Type-II codebook, the number of Precoder Matrix Indicator ("PMI") bits fed back from the User Equipment ("UE") in the Fifth Generation ("5G") Node B ("gNB") via Uplink Control Information ("UCI") can be very large (i.e., greater than 1000 bits at large bandwidth). In addition, the number of Channel State Information Reference Signal ("CSI-RS") ports sent in the downlink ("DL") channel to enable channel estimation at the UE can be large as well, leading to higher system complexity and loss of resources over reference signaling.

BRIEF SUMMARY

Disclosed are procedures for Type-II port-selection codebook generation that utilizes channel correlation to enhance Channel State Information ("CSI") feedback mechanism. The procedures may be implemented by apparatus, systems, methods, or computer program products.

One method of a UE includes receiving a set of reference signals and identifying a set of ports based on the set of reference signals. The method includes selecting a subset of ports from the identified set of ports and generating, based on the reference signals, an amplitude coefficient indicator and at least one phase coefficient indicator for each selected port. The method includes generating a CSI report, where the CSI report comprises a Type-II port-selection codebook corresponding to the generated coefficients and the selected ports.

One method of Radio Access Network ("RAN") includes receiving a set of uplink ("UL") reference signals and identifying a set of channel characteristics based on the UL reference signals. Here, the set of channel characteristics includes parameters corresponding to one or more angles of arrival and relative delay values for a set of different channel paths. The method includes generating a set of DL reference signals based on the channel characteristics inferred from the received set of UL reference signals.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating one embodiment of an equation for describing an uplink channel;

FIG. 4 is a diagram illustrating one embodiment of an equation for describing a noisy estimate of the CSI-RS channel;

FIG. 5 is a diagram illustrating one embodiment of another equation describing a noisy estimate of the CSI-RS channel;

DETAILED DESCRIPTION

Figure 1:
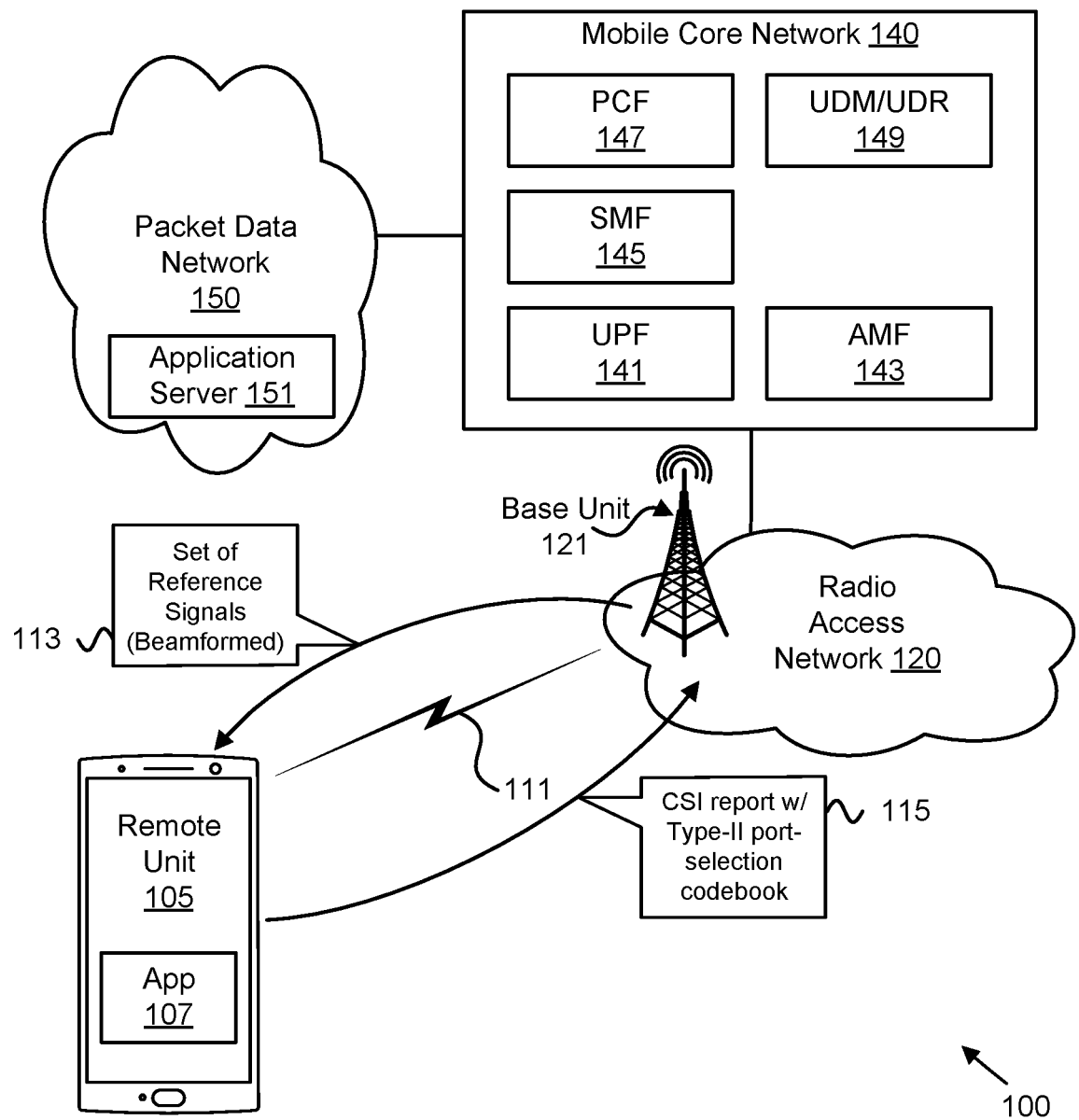
FIG. 1 is a schematic block diagram illustrating one embodiment of a wireless communication system for CSI feedback reporting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures Like numbers refer to like elements in all figures, including alternate embodiments of like elements.

Generally, the present disclosure describes systems, methods, and apparatus Type-II port-selection codebook generation. According to 3GPP Release 16 ("Rel-16"), an NR Type-II codebook enables DL channel estimation with high resolution in a RAN including at least one gNB. As discussed above, for NR Rel-16 Type-II codebook the number of PMI bits fed back from the UE in the gNB via UCI can be very large (e.g., greater than 1000 bits at large bandwidth). In addition, the number of CSI-RS ports sent in the downlink channel to enable channel estimation at the user equipment can be large as well, leading to higher system complexity and loss of resources over reference signaling. Thereby, further reduction of the PMI feedback bits and/or a reduction in the number of CSI-RS ports utilized is needed so as to improve efficiency.

A special case of the NR Rel16 Type-II codebook (dubbed port-selection codebook) was proposed, in which the number of CSI-RS ports was reduced via applying an underlying spatial beamforming process. No insight onto how to design this beamforming process was provided. In addition, it has been recently discussed in the literature that the channel correlation between uplink and downlink channels can be exploited to reduce CSI feedback overhead, even in the Frequency-Division Duplexing ("FDD") mode where the UL-DL carrier frequency spacing is not too large.

Assume the gNB is equipped with a two dimensional ("2D") antenna array with $N_1$, $N_2$ antenna ports per polarization placed horizontally and vertically and communication occurs over $N_3$ PMI subbands. A PMI subband consists of a set of resource blocks, each resource block consisting of a set of subcarriers. In such case, $2N_1N_2N_3$ CSI-RS ports are utilized to enable DL channel estimation with high resolution for NR Rel-16 Type-II codebook.

In order to reduce the UL feedback overhead, a Discrete Fourier transform ("DFT")-based CSI compression of the spatial domain is applied to L dimensions per polarization, where $L<N_1N_2$. Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report.

The $2N_1N_2 \times N_3$ codebook per layer takes on the form $$W = W_1 \tilde{W}_2 W_f^H, \quad \text{Equation (1)}$$

where $W_1$ is a $2N_1N_2 \times 2L$ block-diagonal matrix ($L<N_1N_2$) with two identical diagonal blocks, i.e., $$W_1 = \begin{bmatrix} B & 0 \\ 0 & B \end{bmatrix}, \quad \text{Equation (2)}$$

and B is an $N_1N_2 \times L$ matrix with columns drawn from a 2D oversampled DFT matrix, as follows.

$$u_m = \begin{bmatrix} 1 & e^{j\frac{2\pi m}{O_2 N_2}} & \dots & e^{j\frac{2\pi m(N_2-1)}{O_2 N_2}} \end{bmatrix}, \quad \text{Equation (3)}$$

$$v_{l,m} = \begin{bmatrix} u_m & e^{j\frac{2\pi l}{O_2 N_2}} u_m & \dots & e^{j\frac{2\pi l(N_1-1)}{O_1 N_1}} u_m \end{bmatrix}^T, \quad \text{Equation (4)}$$

$$B = \begin{bmatrix} v_{l_0,m_0} & v_{l_1,m_1} & \dots & v_{l_{L-1},m_{L-1}} \end{bmatrix}, \quad \text{Equation (5)}$$

$$l_i = O_1 n_1^{(i)} + q_1, \; 0 \leq n_1^{(i)} < N_1, \; 0 \leq q_1 < O_1 - 1, \quad \text{Equation (6)}$$

$$m_i = O_2 n_2^{(i)} + q_2, \; 0 \leq n_2^{(i)} < N_2, \; 0 \leq q_2 < O_2 - 1, \quad \text{Equation (7)}$$

where the superscript T denotes a matrix transposition operation. Note that $O_1$, $O_2$ oversampling factors are assumed for the 2D DFT matrix from which matrix B is drawn. Note that $W_1$ is common across all layers. $W_f$ is an $N_3 \times M'$ matrix ($M'<N_3$) with columns selected from a critically-sampled size-$N_3$ DFT matrix, as follows $$W_f = \begin{bmatrix} f_{k_0} & f_{k_1} & \dots & f_{k_{M'-1}} \end{bmatrix}, \; 0 \leq k_i < N_3 - 1, \quad \text{Equation (8)}$$

$$f_k = \begin{bmatrix} 1 & e^{-j\frac{2\pi k}{N_3}} & \dots & e^{-j\frac{2\pi k(N_3-1)}{N_3}} \end{bmatrix}^T. \quad \text{Equation (9)}$$

Only the indices of the L selected columns of B are reported, along with the oversampling index taking on $O_1 O_2$ values. Similarly, for $W_f$, only the indices of the M' selected columns out of the predefined size-$N_3$ DFT matrix are reported. Hence, L, M represent the equivalent spatial and frequency dimensions after compression, respectively. Finally, the $2L \times M$ matrix $\tilde{W}_2$ represents the linear combination coefficients ("LCCs") of the spatial and frequency DFT-basis vectors.

Both are $\tilde{W}_2$ $W_f$ and independent for different layers. Magnitude and phase values of an approximately $\beta$ fraction of the 2LM' available coefficients are reported to the gNB ($\beta<1$) as part of the CSI report. Hence, for a single-layer transmission, magnitude and phase values of a maximum of $\lceil 2, \beta LM' \rceil - 1$ coefficients (along with the indices of selected L, M' DFT vectors) are reported per layer, leading to significant reduction in CSI report size, compared with reporting $2N_1N_2 \times N_3 - 1$ coefficients' information. Note that coefficients with zero magnitude are indicated via a per-layer bitmap.

Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported.

FIG. 1 depicts a wireless communication system 100 CSI feedback reporting, in accordance with aspects of the present disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 111. Even though a specific number of remote units 105, base units 121, wireless communication links 111, RANs 120, and mobile core networks 140 are depicted in FIG. 1, one of skill in the art will recognize that any number of remote units 105, base units 121, wireless communication links 111, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 111. Here, the RAN 120 is an intermediate network that provides the remote units 105 with access to the mobile core network 140.

As depicted, the base unit 121 may transmit a set of reference signals 113 which are received at the remote unit 105. The remote unit 105 uses the set of refence signals 113 to determine channel conditions of the wireless communication link 111 between the remote unit 105 and the base unit 121. Based on the determined channel condition, the remote unit 105 transmits a CSI report 115 to the base unit 121, where the CSI report 115 includes a Type-II port-selection codebook, as described in greater detail below.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF")141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit 105 and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 111. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 111. The wireless communication links 111 may be any suitable carrier in licensed or unlicensed radio spectrum. The wireless communication links 111 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR").

The UPF(s) 141 is responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), or other NFs defined for the 5GC. In certain embodiments, the mobile core network 140 may include an authentication, authorization, and accounting ("AAA") server.

Although specific numbers and types of network functions are depicted in FIG. 1, one of skill in the art will recognize that any number and type of network functions may be included in the mobile core network 140. Moreover, in an LTE variant where the mobile core network 140 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. Where different network slices are deployed, the mobile core network 140 may include a Network Slice Selection Function ("NSSF") which is responsible for selecting of the Network Slice instances to serve the remote unit 105, determining the allowed NSSAI, determining the AMF set to be used to serve the remote unit 105.

While FIG. 1 depicts components of a 5G RAN and a 5G core network, the described embodiments for Type-II port-selection codebook generation apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting CSI feedback reporting.

Figure 2:
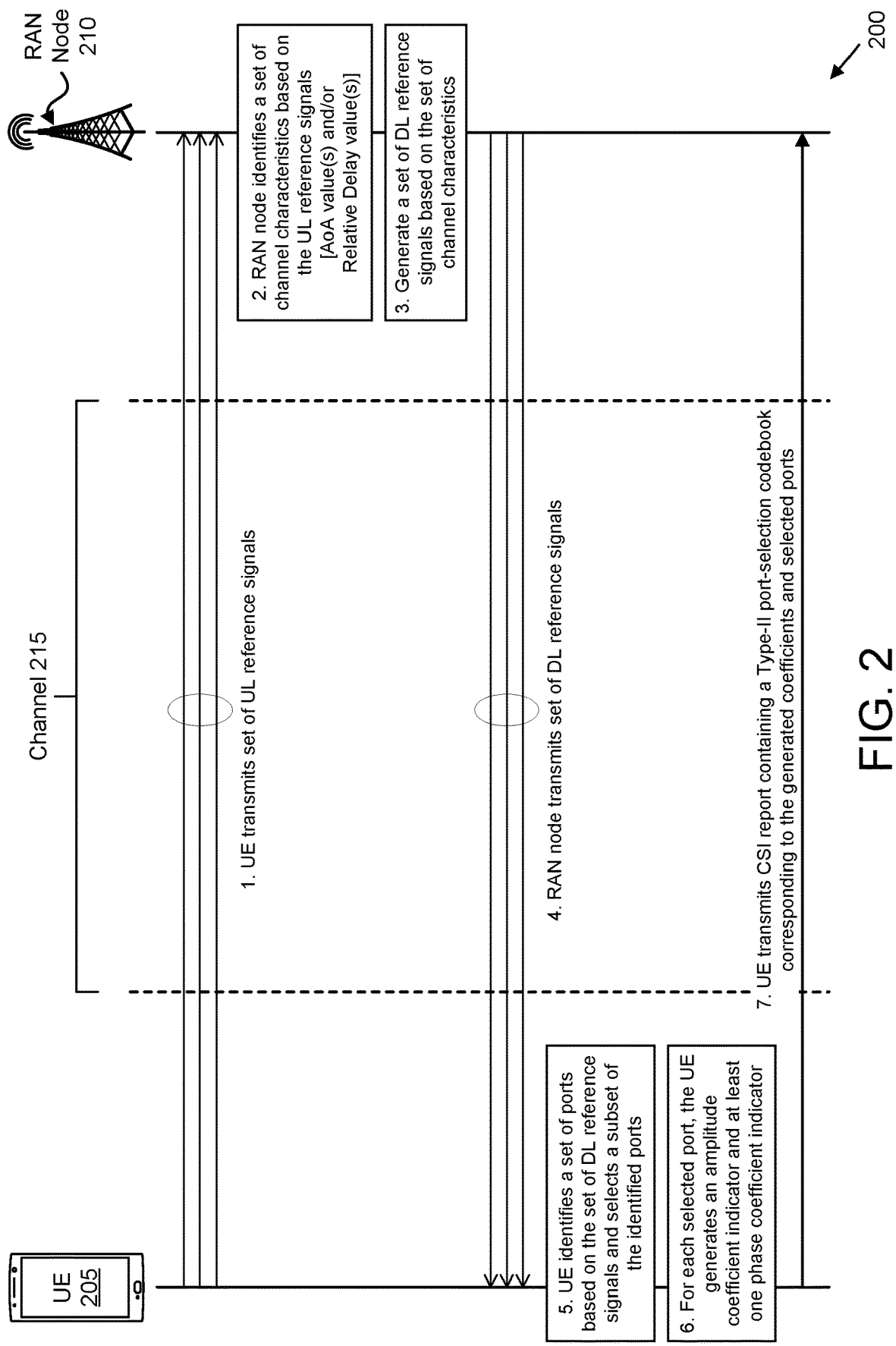
FIG. 2 is a diagram illustrating one embodiment of CSI reporting, e.g., using Type-II Port Selection codebook.

FIG. 2 depicts a procedure 200 for CSI reporting, e.g., using Type-II Port Selection codebook, in accordance with aspects of the present disclosure. The procedure 200 involves a UE 205 in communication with a RAN node 210. The UE 205 and RAN node 210 communicate wirelessly via a communication channel 215. A radio signal propagates from the transmitter to the receiver via the channel 215 and is affected by channel conditions, e.g., the combined effect of scattering, fading, and power decay with distance.

At Step 1, the UE 205 sends a set of uplink ("UL") reference signals to the RAN node 210. In one embodiment, the set of UL reference signals includes a DeModulation Reference Signal ("DM-RS"). Here, the DM-RS may be associated with transmission of uplink data on PUSCH or transmission of control signaling on PUCCH. In another embodiment, the set of UL reference signals may include a sounding reference signal ("SRS").

At Step 2, the RAN node 210—having received the set of UL reference signals—identifies a set of channel characteristics based on the UL reference signals. For example, the channel characteristics may include parameters corresponding to angles of arrival and/or relative delay values for a set of different channel paths. Here, the channel characteristics describe current conditions of the channel 215.

At Step 3, the RAN node 210 generates a set of DL reference signals based on the determined channel characteristics. In certain embodiments, the set of DL reference signals may be beamformed using a beamforming function, where the beamforming function is based on the determined channel characteristics.

At Step 4, the RAN node 210 transmits the generated set of DL reference signals. In various embodiments, the set of DL reference signals includes a set of CSI-RS signals.

At Step 5, the UE 205 identifies a set of ports based on the set of DL reference signals and selects a subset of the identified ports, as described in greater detail below.

At Step 6, for each selected port, the UE 205 generates an amplitude coefficient indicator and at least one phase coefficient indicator.

At Step 7, the UE 205 transmits a CSI reports containing a Type-II port-selection codebook corresponding to the generated coefficients. The CSI report allows the RAN node 210 to adapt its transmissions to the current conditions/characteristics of the channel 215. The process of generating the CSI report and Type-II port-selection codebook is described in greater detail below.

For Type-II Port Selection codebook, only K (where $K \leq 2N_1N_2$) beamformed CSI-RS ports are utilized in DL transmission, in order to reduce complexity. The $K \times N_3$ codebook matrix per layer takes on the form $$W = W_1^{PS} \tilde{W}_2 W_f^H, \quad \text{Equation (10)}$$

Here, $\tilde{W}_2$ and $W_3$ follow the same structure as the conventional NR Rel-16 Type-II Codebook and are layer specific. $W_1$ is a $K \times 2L$ block-diagonal matrix with two identical diagonal blocks, i.e., $$W_1^{PS} = \begin{bmatrix} E & 0 \\ 0 & E \end{bmatrix}, \quad \text{Equation (11)}$$

and E is an $$\frac{K}{2} \times L$$

matrix whose columns are standard unit vectors, as follows.

$$E = [e_{mod(m_{PS}d_{PS},K/2)}^{(K/2)} e_{mod(m_{PS}d_{PS}+1,K/2)}^{(K/2)} \ldots e_{mod(m_{PS}d_{PS}+L-1,K/2)}^{(K/2)}] \quad \text{Equation (112)}$$

where $e_i^{(K)}$ is a standard unit vector with a 1 at the $i^{th}$ location. Here, $d_{PS}$ is a Radio Resource Control ("RRC") parameter which takes on the values $\{1,2,3,4\}$ under the condition $d_{PS} \leq \min(K/2, L)$, whereas $m_{PS}$ takes on the values $$\left\{0, \ldots, \left\lceil \frac{K}{2d_{PS}} \right\rceil - 1\right\}$$

and is reported as part of the UL CSI feedback overhead. $W_1$ is common across all layers. Note that $m_{PS}$ parametrizes the location of the first 1 in the first column of E, whereas $d_{PS}$ represents the row shift corresponding to different values of $m_{PS}$.

For K=16, L=4 and $d_{PS}=1$, the 8 possible realizations of E corresponding to $m_{PS}=\{0, 1, \ldots, 7\}$ are as follows:

$$\begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, \begin{bmatrix} 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix},$$

$$\begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \end{bmatrix}, \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix}, \begin{bmatrix} 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \end{bmatrix}.$$

When $d_{PS}=2$, the 4 possible realizations of E corresponding to $m_{PS}=\{0,1,2,3\}$ are as follows:

$$\begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix}, \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix}.$$

When $d_{PS}=3$, the 3 possible realizations of E corresponding of $m_{PS}=\{0,1,2\}$ are as follows $$\begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix}, \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix}.$$

When $d_{PS}=4$, the 2 possible realizations of E corresponding of $m_{PS}=\{0,1\}$ are as follows $$\begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}.$$

To improve the efficiency of Type-II port-selection codebook operation, disclosed herein are novel approaches that can be individually or jointly implemented to improve the performance of the Type-II port selection codebook by utilizing the reciprocity between UL and DL channels. The proposed approaches vary in terms of reducing either the CSI-RS transmission complexity, the CSI feedback overhead or both. Different approaches are expected to have different impact on the performance, which also depends on the validity of the channel reciprocity assumption. Utilizing partial reciprocity between UL & DL channels in NR 5G FDD systems was motivated as a possible improvement in channel feedback reporting in NR.

Initially, assume a channel with P paths, where $P_{UL}$, $P_{DL}$ paths are detected in UL & DL, respectively, and $P_{UL} \leq P$, $P_{DL} \leq P$. Here, the number of sub-bands is $N_3$ with index $n=0, \ldots, N_3-1$. The number of antennas at the RAN node 210 (e.g., gNB) per polarization is $N_1N_2$ with index $s=0, \ldots, N_1N_2-1$. The number of antennas at the UE 205 per polarization is $N'_1N'_2$ with index $u=0, \ldots, N'_1N'_2-1$.

Without loss of generality, one can assume the coordinate system is rotated such that the RAN node antenna panel occupies the YZ-plane. For ease of exposition, it is assumed the UE antenna panel is parallel to that of the RAN node 210. Nevertheless, the UE antenna panel orientation can be general and will be implicit in the channel model.

FIG. 3 depicts an equation 300 for a UL channel. The UL channel, $h_{s,u}^{UL}(n)$, is characterized as shown in FIG. 3. The following parameters found in the equation 300 are defined:

$g_p^{UL}$: Complex gain of path p in the UL channel
$\Delta f$: PMI Sub-band spacing
$\tau_p$: Delay of path p
$F_c$: UL Carrier Frequency
c: Speed of light
$(d_1, d_2)$: Horizontal and vertical antenna spacing at gNB. Antennas are placed in YZ-plane
$(d'_1, d'_2)$: Horizontal and vertical antenna spacing at UE. Antennas are placed in YZ-plane
$\phi_p$: Angle-of-Arrival ("AoA") of path p (gNB side)
$\phi'_p$: Angle-of-Departure ("AoD") of path p (UE side)
$\theta_p$: Zenith AoA ("ZoA") of path p (gNB side)
$\theta'_p$: Zenith AoD ("ZoD") of path p (UE side)
t: Time index corresponding to subsequent CSI-RS transmissions
v: Relative speed between gNB & UE
$T_{CSI}$: Time duration between CSI-RS transmissions
$v_p$: Angle between the moving direction & the signal departing direction of path p. Direction is in Z-plane
s: gNB antenna index such that $s = s_1 \cdot N_2 + s_2$
u: UE antenna index such that $u = u_1 \cdot N'_2 + u_2$
The UL channel $h_m^{UL}(n)$ can be expressed by:

$$h_{s,u}^{UL}(n) = \hat{h}_{s,u}^{UL}(n) + \epsilon h_{s,u}^{UL}(n) \quad \text{Equation (13)}$$

where $\hat{h}_{u,s}^{UL}(n)$ is the UL channel estimate at the RAN node 210 and is characterized by:

$$\hat{h}_{s,u}^{UL}(n) = \quad \text{Equation (14)}$$

$$\sum_{p=0}^{P_{UL}-1} \alpha_p^{UL} e^{j2\pi\left(\psi_{p,u}^{UL} + n\Delta f \tau_p + s_1 \frac{F_c d_1}{c} \sin\theta_p \sin\phi_p + s_1 \frac{F_c d_2}{c} \cos\theta_p\right)}$$

Further:

$$\alpha_p^{UL} = \text{abs}(g_p^{UL}) \quad \text{Equation (15)}$$

$$\psi_{p,u}^{UL} = \text{angle} \quad \text{Eq. (16)}$$

$$(g_p^{UL}) \cdot e^{j2\pi \frac{vF_c T_{CSI}}{c} \cos\theta_p \cos\vartheta_p} \cdot e^{j2\pi u_1 \frac{F_c d'_1}{c} \sin\theta'_p \sin\phi'_p + j2\pi u_2 \frac{F_c d'_2}{c} \cos\theta'_p}$$

$$\epsilon_{s,u}^{UL}(n) = \sum_{p'=P_{UL}}^{P-1} g_{p'}^{UL} e^{j2\pi(\text{expr}1 + \text{expr}2)} \quad \text{Equation (17)}$$

where $$\text{expr}1 = n\Delta f \tau_{p'} + u_1 \frac{F_c d'_1}{c} \sin\theta'_{p'} \sin\phi'_{p'} + u_2 \frac{F_c d'_2}{c} \cos\theta'_{p'}, \text{ and} \quad \text{Equation (18)}$$

$$\text{expr}2 = \quad \text{Equation (19)}$$

$$s_1 \frac{F_c d_1}{c} \sin\theta_{p'} \sin\phi_{p'} + s_2 \frac{F_c d_2}{c} \cos\theta_{p'} + t \frac{vF_c T_{CSI}}{c} \cos\vartheta_{p'}$$

Assume that the downlink carrier frequency is $F_c + \Delta F$. In certain embodiments, the number of delay paths, the path delays, as well as the angles of arrival/departure are reciprocal for both UL and DL channels, i.e., UL and DL channels share similar P, $\{\tau_p, \theta_p, \phi_p\}_{p=0}^{P-1}$; only the channel gain $g_p$, and in turn $\{\alpha_p, \psi_p\}$, would not reciprocate.

The DL channel would then be:

$$h_{u,s}^{DL}(n) = \hat{h}_{u,s}^{DL}(n) + \epsilon_{u,s}^{DL}(n) \quad \text{Equation (20)}$$

where $$\hat{h}_{u,s}^{DL}(n) = \sum_{p=0}^{P_{DL}-1} \alpha_p^{DL} \quad \text{Eq. (21)}$$

$$e^{j2\pi\left(\psi_{p,u}^{DL} + (\Delta F + n\Delta f)\tau_p + s_1 \frac{(F_c+\Delta F)d_1}{c} \sin\theta_p \sin\phi_p + s_2 \frac{(F_c+\Delta F)d_2}{c} \cos\theta_p\right)},$$

Note here that $P^{UL} \neq P^{DL}$. Here assume $P^{UL} \leq P^{DL}$.

Assume the RAN node 210 sends $K/2 = P^{UL} \leq N_1 N_2$ beamformed CSI-RS ports to the UE 205 per polarization, where the $2N_1N_2 \times K$ CSI-RS beamforming matrix G(n) is designed as either one of the following alternatives:

$$G(n) = \begin{bmatrix} \dot{G}(n) & 0 \\ 0 & \dot{G}(n) \end{bmatrix} \quad \text{Equation (22)}$$

where $$\dot{G}(n) = \quad \text{Equation (23)}$$

$$\left[e^{-j2\pi\left((\Delta F + n\Delta f)\tau_k + s_1 \frac{(F_c+\Delta F)d_1}{c} \sin\theta_k \sin\phi_k + s_2 \frac{(F_c+\Delta F)d_2}{c} \cos\theta_k\right)}\right]_{s,k}$$

Alternatively:

$$G(n) = \begin{bmatrix} \ddot{G}(n) & 0 \\ 0 & \ddot{G}(n) \end{bmatrix} \quad \text{Equation (24)}$$

-continued where $$\ddot{G}(n) = B \times \text{diag}\left(\left[e^{-j2\pi(\Delta + n\Delta f)\tau_k}\right]_k\right) \quad \text{Equation (25)}$$

Here, $\text{diag}([\lambda]_k)$ is a diagonal matrix whose $k^{th}$ diagonal entry is $\lambda$. B is a size $$N_1 N_2 \times \frac{K}{2} \text{ matrix}$$

matrix whose columns are selected from the columns of a size $N_1N_2$ DFT matrix, which is constructed in a manner similar to that described above with reference to the NR Rel-16 Type-II Codebook.

Looking into one polarization of the channel, and assuming the CSI-RS beamforming matrix is set to the first choice, for ease of exposition, the received signal would be in the form $$x_{k,u}^{DL}(n) = \sum_{s=0}^{N_1 N_2 - 1} h_{u,s}^{DL}(n)\dot{G}_{(s,k)}(n)c_k(n) + \dot{z}_{k,u}(n), \quad \text{(Equation 26)}$$

where $c_k(n)$ represents the CSI-RS symbol (known at both nodes) and $\dot{z}_{k,u}(n)$ is the background noise.

FIG. 4 depicts an equation 400 for describing a noisy estimate of the CSI-RS channel. The UE 205 may apply some filtering (e.g., zero-forcing ("ZF") or minimum mean square error ("MMSE") filtering) to estimate $h_{u,s}^{DL}(n)\dot{G}_{(s,k)}(n)$, such that the noisy estimate of the channel corresponding to CSI-RS k is then characterized by Equation 400 as shown in FIG. 4.

One can average the received signal across frequency samples to estimate the first term in $y_{k,u}^{DL}(n)$, which is independent of n, as follows:

$$\bar{y}_{k,u}^{DL} = \frac{1}{N_{SB}} \sum_{n=0}^{N_3-1} y_{k,u}^{DL}(n) \quad \text{Equation (27)}$$

Further, one can define $$\tilde{z}_{k,u}(n) \triangleq y_{k,u}^{DL}(n) - \bar{y}_{k,u}^{DL} \quad \text{Equation (28)}$$

Note that the smaller the variance of $\tilde{z}_{k,u}(n)$, the better the terms $$\left\{\alpha_k^{DL} e^{j2\pi\psi_{k,u}^{DL}}\right\}_{k=0}^{K-1}$$

are estimated, and hence 2L of these $\{\alpha_k^{DL}, \tilde{\psi}_k^{DL}\}$ amplitude/phase coefficient pairs (across both polarizations) are reported to the RAN node 210, where $$\tilde{\psi}_k^{DL} = f\left(\{\psi_{k,u}^{DL}\}_{u=0}^{N_1'N_2'-1}\right).$$

Recall that 2L≤K. Note that $\tilde{z}_{k,u}(n)$ would vanish if (i) the relative delays within are integer multiples of 1/Δf, (ii) $P = P_{UL}$ and (iii) $z_{k,u}(n) \sim 0$. Generally, this is not always true and the variance of $\tilde{z}_{k,u}(n)$ is non-negligible, indicating the need of some kind of sub-band information being reported by the UE 205.

In the sequel, one can extend the analysis to the case where $\tau_k^{UL} \neq \tau_k^{DL}$ and $\theta_k^{UL} \neq \theta_k^{DL}$.

$$\dot{G}'(n) = \quad \text{Equation (29)}$$

$$\left[e^{-j2\pi\left((\Delta F + n\Delta f)\tau_k^{UL} + s_1 \frac{(F_c + \Delta F)d_1}{c} \sin\theta_k^{UL} \sin\phi_k^{UL} + s_2 \frac{(F_c + \Delta F)d_2}{c} \cos\theta_k^{UL}\right)}\right]_{s,k}$$

FIG. 5 depicts an equation 500 for describing a noisy estimate of the CSI-RS channel, in accordance with aspects of the present disclosure. Here, the expression for $y'_{k,u}^{DL}(n)$ is characterized by equation 500 as shown in FIG. 5. Note that the larger the mismatch between $\tau_k^{UL}$, $\tau_k^{DL}$ the higher the likelihood of the first term in the right-hand side ("RHS") of the $y'_k^{DL}(n)$ equation 500 would vanish.

According to a first solution, the $2N_1N_2 \times K$ CSI-RS beamforming matrix G(n) at frequency band n may be designed as:

$$G(n) = \begin{bmatrix} \dot{G}(n) & 0 \\ 0 & \dot{G}(n) \end{bmatrix} \quad \text{Equation (30)}$$

where $$\dot{G}(n) = \quad \text{Equation (31)}$$

$$\left[e^{-j2\pi\left((\Delta F + n\Delta f)\tau_k + s_1 \frac{(F_c + \Delta F)d_1}{c} \sin\theta_k \sin\phi_k + s_2 \frac{(F_c + \Delta F)d_2}{c} \cos\theta_k\right)}\right]_{s,k}$$

In an alternative embodiment of the first solution, the $2N_1N_2 \times K$ CSI-RS beamforming matrix G(n) at frequency band n may be designed as:

$$G(n) = \begin{bmatrix} \ddot{G}(n) & 0 \\ 0 & \ddot{G}(n) \end{bmatrix}, \quad \text{Equation (32)}$$

where $\ddot{G}(n) = B \times \text{diag}\left(\left[e^{-j2\pi(\Delta F + n\Delta f)\tau_k}\right]_k\right)$ where $\text{diag}([\lambda]_k)$ is a diagonal matrix whose $k^{th}$ diagonal entry is $\pi$. B is a size $$N_1 N_2 \times \frac{K}{2} \text{ matrix}$$

whose columns are a subset of the columns of a size $N_1N_2$ 2D DFT matrix, with a structure that resembles that described above with reference to the NR Rel-16 Type-II Codebook, yet fully selected by the RAN node 210. Other designs of G(n) that depend on both the azimuth, zenith angles of departure, arrival between the UE 205 and the RAN node 210, as well as the path delay values.

Regarding CSI Reporting, the aforementioned approach implies the following: Reporting one amplitude and phase value per selected port (2L coefficients) as follows $\{\alpha_\ell^{DL}, \tilde{\psi}_\ell^{DL}\}_{\ell=0}^{2L-1}$ which represent $$\left\{\alpha_\ell^{DL} e^{j2\pi\tilde{\psi}_\ell^{DL}}\right\}_{\ell=0}^{2L-1}, \text{ where } \tilde{\psi}_\ell^{DL} = f\left(\{\psi_{\ell,u}^{DL}\}_{u=0}^{N_1'N_2'-1}\right).$$

Recall that the UE 205 selects L out of K/2 ports per polarization, which may not necessarily be in a specific order, as shown in the following section. However, a few challenges occur:

The larger the discrepancy in path phases corresponding to different UE antennas $\{\psi_{\ell,u}^{DL}\}_{u=0}^{N'_1N'_2-1}$, the worse the performance if only one phase $\tilde{\psi}_\ell^{DL}$ is reported per port.

The variance of $\tilde{z}_{k,u}(n)$ is large.

The UL & DL delay values are mismatched, i.e., $\tau_k^{UL} \neq \tau_k^{DL}$.

This requires reporting additional phase values per port, to either represent phase differences across different UE antennas, or phase perturbation across sub-bands, or both. The number of additional phase values reported per port can be parametrized by either an RRC parameter or specified (and reported) by the UE 205. In that sense, the UE 205 reports one amplitude coefficient indicator per CSI-RS port per polarization +δ phase coefficient indicators per CSI-RS port per polarization, where δ scales with either one (or a combination) of the following factors:

The number of SRS ports utilized to estimate the UL channel

The rank indicator reported in the CSI report

The number of PMI sub-bands in the channel

An RRC parameter set by the network

A new parameter reported by the UE 205 to indicate the number of phase coefficients included in the CSI report According to a second solution, the UE 205 reports one amplitude coefficient and multiple phase coefficients per CSI-RS port in the CSI report.

Regarding Layer-Specific Port Selection, in NR Rel-16, the Type-II Port Selection codebook for layer v is as follows $$W^{(v)} = W_1^{PS}\tilde{W}_2^{(v)}W_f^{(v)H} \qquad \text{Equation (33)}$$

where $W_1(2N_1N_2 \times K)$ is layer common, whereas $\tilde{W}_2$ and $W_f$ are layer-specific. One way to extend the codebook is via making $W_1$ layer-specific, i.e., $$w^{(v)}(n) = G(n)W_1^{PS}\overline{w}_2 \qquad \text{Equation (34)}$$

In this case, the UE 205 selects a distinct beam (port) combination for each layer, e.g., for rank 2 transmission, the UE 205 then reports $E_1$, $E_2$, wherein the selected ports across both layers may be disjoint, so as to enable designing $W_1^{PS(1)}$, $W_1^{PS(2)}$ respectively, each a matrix of size K×2L.

Here, $E_1$, $E_2$ may each be designed in a manner similar to that in Rel-16, i.e., $$\left\lceil \log_2\left\lceil \frac{K}{2d_{PS}} \right\rceil \right\rceil$$

bits per layer, or based on free selection, e.g., K/2 bits per layer via a bitmap or $\lceil \log_2 C_L^{K/2} \rceil$, where $C_b^a$ is a mathematical combination n-Choose-k(a,b). Recall G(n) is a matrix of size $2N_1N_2 \times K$, whereas $\overline{w}_2$ is a vector of length 2L.

Another embodiment includes enforcing a layer-specific $\overline{w}_2$, as follows $$W^{(v)}(n) = G(n)W_1^{PS}\overline{w}_2^{(v)}, \qquad \text{Equation (35)}$$

where the change in phase values in $\overline{w}_2^{(v)}$ may represent the azimuth/zenith angles of arrival at different UE antenna ports.

Another embodiment can also include some slight modification to G(n), as follows $$W^{(v)}(n) = \overline{G}(n)W_1^{PS(v)}\overline{w}_2^{(v)}, \qquad \text{Equation (36)}$$

where $$\overline{G}(n) \triangleq G(n) \odot \Omega(n), \qquad \text{Equation (37)}$$

and $$\Omega(n) \triangleq \begin{bmatrix} \Omega'(n) & 0 \\ 0 & \Omega'(n) \end{bmatrix}. \qquad \text{Equation (38)}$$

As used herein, the mathematical expression "A⊙B" represents the Hadamard product of matrices A, B, and Ω'(n) is an $$N_1N_2 \times \frac{K}{2} \text{ matrix}$$

matrix whose entries have a unit magnitude.

As a third solution, the UE 205 may report layer-specific port selection matrix in the CSI report, where the port selection per layer could be either restricted (consecutive ports only), or free selection via a bitmap, or free selection via combinatorics.

Regarding CQI Reporting, given the UL and DL channel reciprocity, the RAN node 210 already knows some partial information of the DL channel (path delays, azimuth/zenith angles of departure), except for the channel gain which is not reciprocal. Given that the channel gain is frequency independent, the UE 205 may only report the wideband CQI to the RAN node 210, whereas the RAN node 210 can infer the sub-band CQI given the wideband CQI and the partial channel information deduced from the UL channel.

As a fourth solution, the UE 205 may report only wideband CQI in the CSI report.

Figure 6:
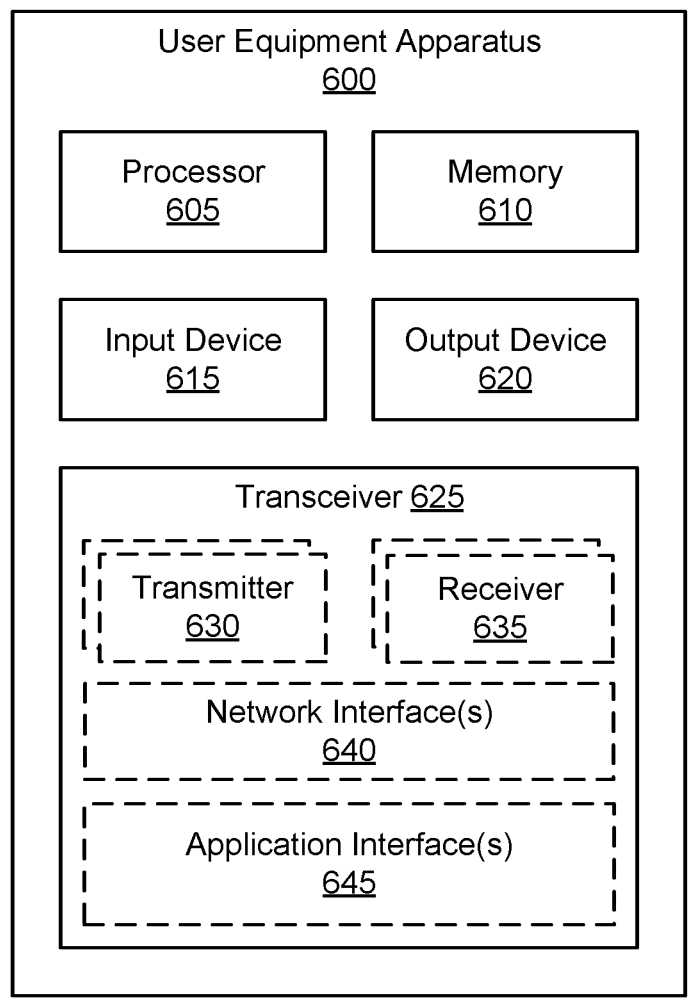
FIG. 6 is a diagram illustrating one embodiment of a user equipment apparatus that may be used Type-II port-selection codebook generation.

FIG. 6 depicts a user equipment apparatus 600 that may be used Type-II port-selection codebook generation, in accordance with aspects of the present disclosure. In various embodiments, the user equipment apparatus 600 is used to implement one or more of the solutions described above. The user equipment apparatus 600 may be one embodiment of the remote unit 105, the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 may communicate with the RAN using one or more (e.g., up to 4) transmission layers. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

In various embodiments, the processor 605 controls the user equipment apparatus 600 to implement the above described UE behaviors. For Type-II port-selection codebook generation, the processor 605 receives a set of downlink reference signals via the transceiver 625. In some embodiments, the received set of downlink reference signals are beamformed using a beamforming function. In such embodiments, the beamforming function is based on one or more channel characteristics comprising parameters corresponding to at least one of an angle of arrival value and a relative delay value for a set of different channel paths.

In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

The processor identifies a set of ports based on the set of downlink reference signals and selects a subset of ports from the identified set of ports. For example, the user equipment apparatus 600 may be configured with 6 to 32 ports. After receiving the set of downlink reference signals, the processor 605 may then select a subset of the ports for CSI feedback, for example 2 to 6 ports. In some embodiments, the set of downlink reference signals correspond to a plurality of transmission layers, where a different subset of the set of ports is selected for each transmission layer.

In some embodiments, the port selection per transmission layer is restricted to a set of consecutive ports. In certain embodiments, the port selection per transmission layer is polarization-common. In one embodiment, the port selection per transmission layer is indicated using a bitmap. In another embodiment, the port selection per transmission layer is indicated using a combinatoric value.

The processor 605 generates, based on the set of downlink reference signals, an amplitude coefficient indicator and at least one phase coefficient indicator for each selected port. In some embodiments, the indicated amplitude coefficient corresponds to a plurality of phase coefficients per port. In other embodiments, the indicated amplitude coefficient corresponds to one phase coefficient per port.

The processor 605 generates a CSI report and controls the transceiver 625 to sends the CSI report to the RAN. Here, the CSI report consists of a Type-II port-selection codebook corresponding to the generated coefficients and the selected ports. In some embodiments, the CSI report indicates a set of one or more of phase coefficient values for each of the selected ports. In some embodiments, the CSI report includes only a wideband CQI value.

In some embodiments, the CSI report comprises a layer-specific selected subset of the set of ports. In certain embodiments, the port selection per transmission layer is restricted to a set of consecutive ports. In certain embodiments, the port selection per transmission layer is polarization-common. In one embodiment, the port selection per transmission layer is indicated using a bitmap. In another embodiment, the port selection per transmission layer is indicated using a combinatoric value.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to Type-II port-selection codebook generation. For example, the memory 610 may store various parameters, configurations, resource assignments, policies, and the like as described above. In certain embodiments, the memory 610 also stores program code and related data, such as an operating system or other controller algorithms operating on the user equipment apparatus 600, and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
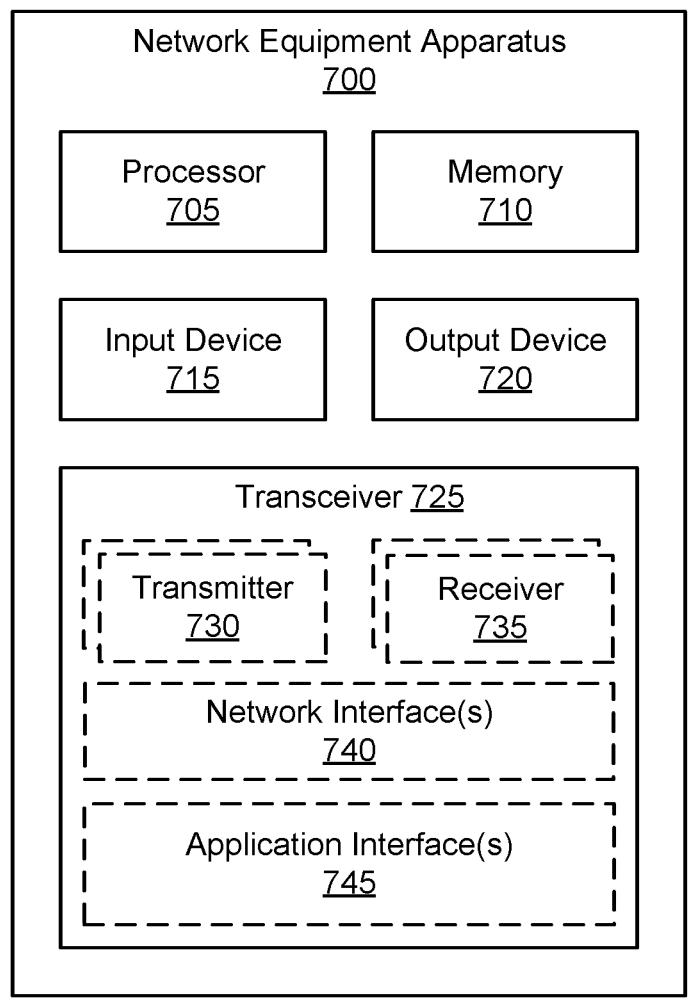
FIG. 7 is a diagram illustrating one embodiment of a network apparatus that may be used Type-II port-selection codebook generation.

FIG. 7 depicts a network apparatus 700 that may be used for Type-II port-selection codebook generation, in accordance with aspects of the present disclosure. In one embodiment, network apparatus 700 may be one implementation of a RAN node, such as the base unit 121, the RAN node 210, or gNB, described above. In another embodiment, the network apparatus 700 may be one implementation of an AMF, such as the AMF 143 and/or the AMF 215 described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that sends UE configurations and receives measurement reports, as described herein. In such embodiments, the processor 705 controls the network apparatus 700 to perform the above described behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 controls the network apparatus 700 to implement the above described RAN behaviors. For generating a beamforming matrix for each frequency index for Type-II port-selection codebook, the processor 705 identifies a set of channel characteristics based on the uplink reference signals. Here, the set of channel characteristics includes parameters corresponding to one or more angles of arrival and relative delay values for different channel paths. The processor 705 generates a set of downlink reference signals based on the channel characteristics inferred from the received set of uplink reference signals. The processor 705 controls the transceiver 725 to transmit the generated set of downlink reference signals, e.g., to one or more UEs served by the network apparatus 700.

In some embodiments, the generated set of downlink reference signals are beamformed using a beamforming function. In such embodiments, the beamforming function is based on the one or more channel characteristics. In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to Type-II port-selection codebook generation. For example, the memory 710 may store parameters, configurations, resource assignments, policies, and the like, as described above. In certain embodiments, the memory 710 also stores program code and related data, such as an operating system or other controller algorithms operating on the network apparatus 700, and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
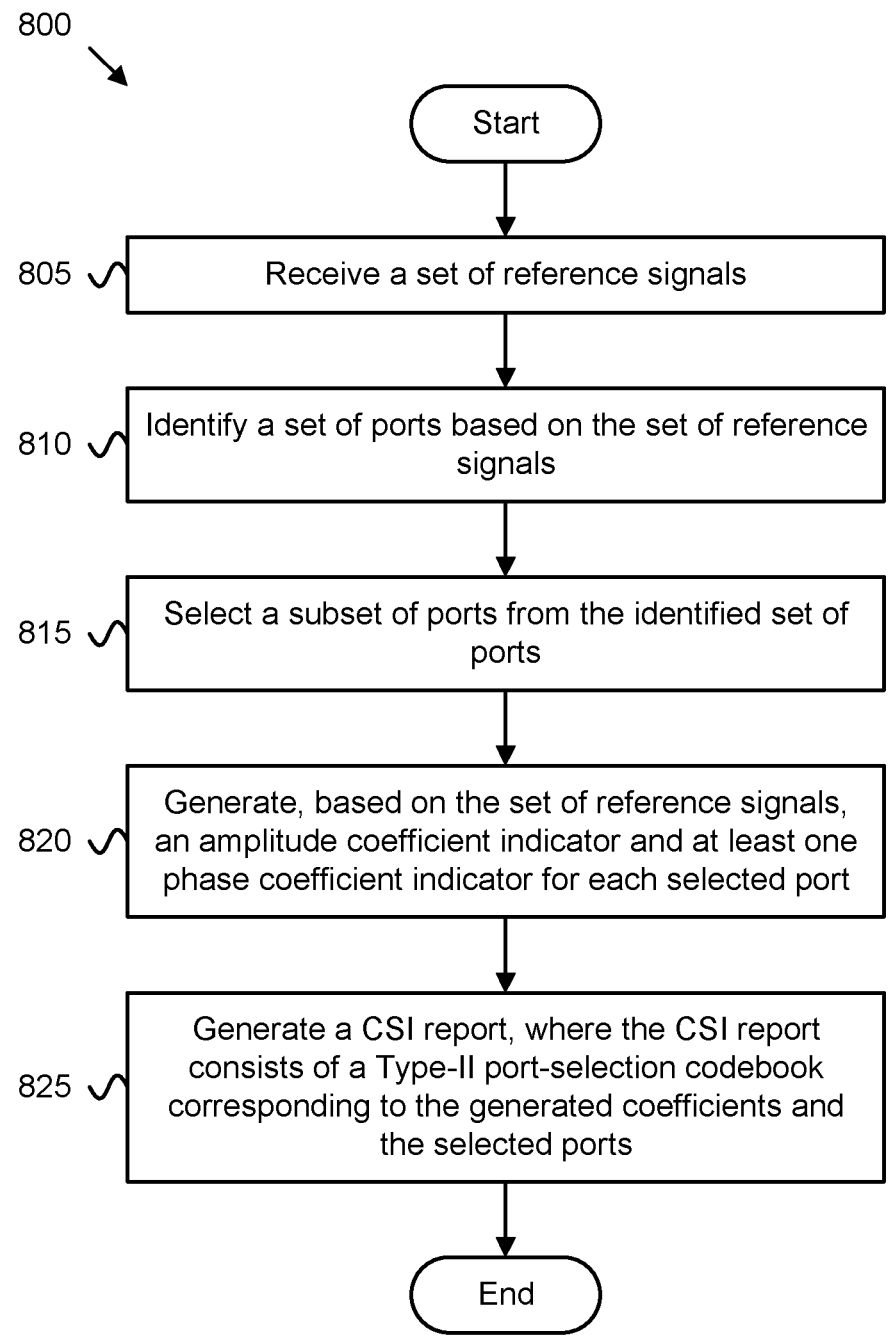
FIG. 8 is a flowchart diagram illustrating one embodiment of a first method Type-II port-selection codebook generation.

FIG. 8 depicts one embodiment of a method 800 for Type-II port-selection codebook generation, in accordance with aspects of the present disclosure. In various embodiments, the method 800 is performed by a UE, such as the remote unit 85, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a set of reference signals. The method 800 includes identifying 810 a set of ports based on the set of reference signals. The method 800 includes selecting 815 a subset of ports from the identified set of ports. The method 800 includes generating 820, based on the set of reference signals, an amplitude coefficient indicator and at least one phase coefficient indicator for each selected port. The method 800 includes generating 825 a CSI report, where the CSI report consists of a Type-II port-selection codebook corresponding to the generated coefficients and the selected ports. The method 800 ends.

Figure 9:
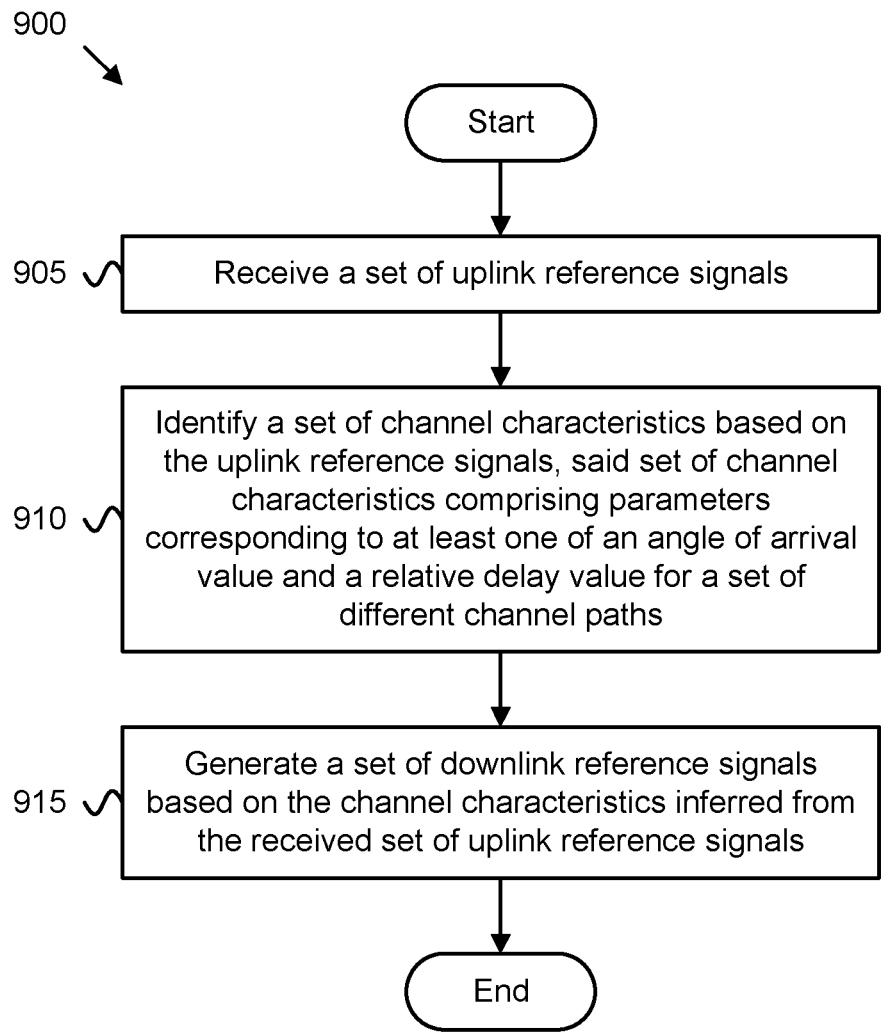
FIG. 9 is a flowchart diagram illustrating one embodiment of a second method Type-II port-selection codebook generation.

FIG. 9 depicts one embodiment of a method 900 for Type-II port-selection codebook generation, in accordance with aspects of the present disclosure. In various embodiments, the method 900 is performed by a RAN node, such as the base unit 121, the gNB 210 and/or the network apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a set of uplink reference signals. The method 900 includes identifying 910 a set of channel characteristics based on the uplink reference signals, the set of channel characteristics comprising parameters corresponding to at least one of an angle of arrival value and a relative delay value for a set of different channel paths. The method 900 includes generating 915 a set of downlink reference signals based on the channel characteristics inferred from the received set of uplink reference signals. The method 900 ends.

Figure 10:
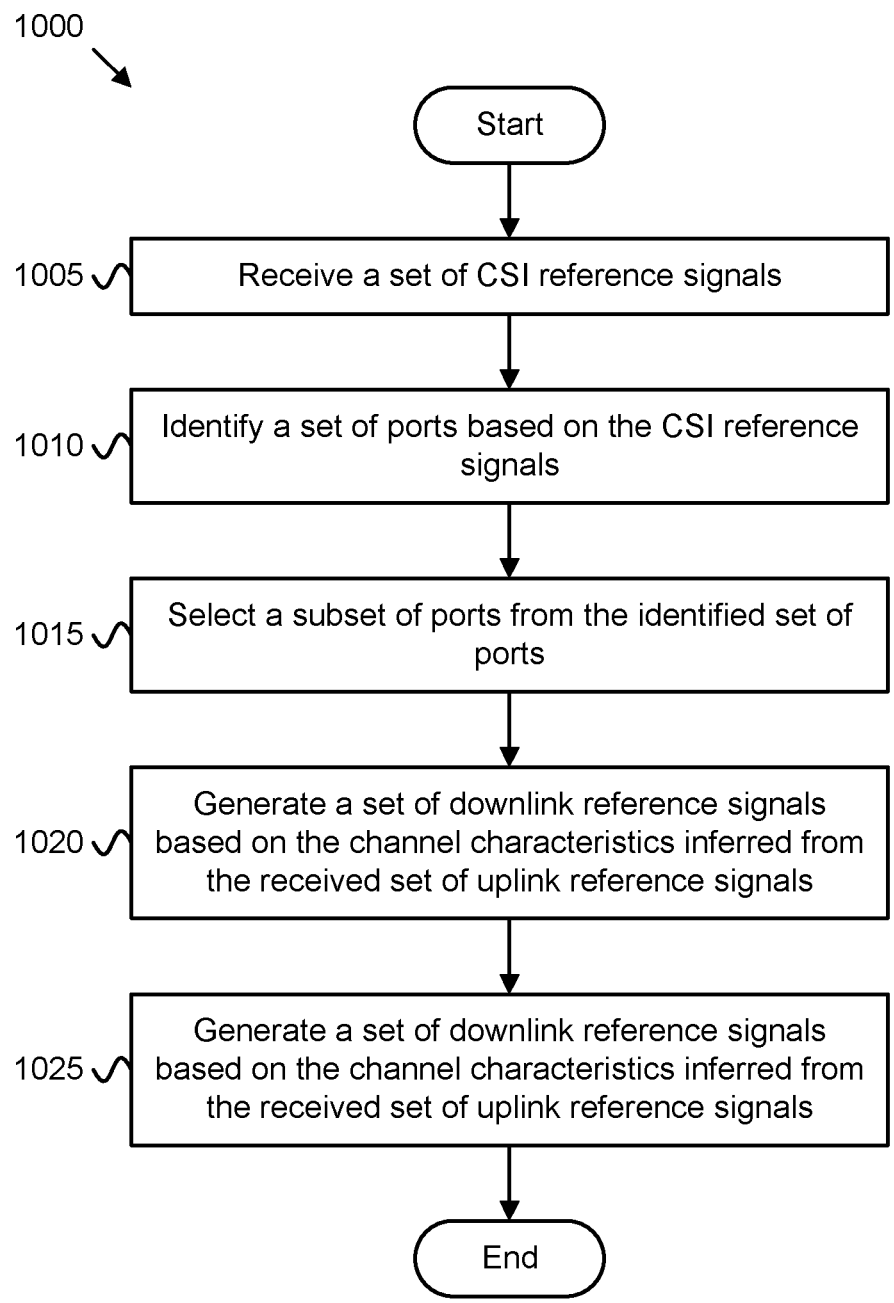
FIG. 10 is a flowchart diagram illustrating one embodiment of a third method Type-II port-selection codebook generation.

FIG. 10 depicts one embodiment of a method 1000 for Type-II port-selection codebook generation, in accordance with aspects of the present disclosure. In various embodiments, the method 1000 is performed by a UE, such as the remote unit 105, the UE 205 and/or the user equipment apparatus 600, described above. In some embodiments, the method 1000 is performed by a processor, such as a microcontroller, a microprocessor, a CPU, a GPU, an auxiliary processing unit, a FPGA, or the like.

The method 1000 begins and receives 1005 a set of CSI reference signals. The method 1000 includes identifying 1010 a set of ports based on the set of CSI reference signals. The method 1000 includes selecting 1015 a subset of ports from the identified set of ports. The method 1000 includes generating 1020 a set of amplitude coefficient indicators and a set of phase coefficient indicators corresponding to the subset of ports. The method 1000 includes generating 1025 a CSI report comprising an indication of the subset of ports, the set of amplitude coefficient indicators, and the set of phase coefficient indicators, where the indication of the subset of ports comprises a combinatoric value. The method 1000 ends.

Disclosed herein is a first apparatus for Type-II port-selection codebook generation, in accordance with aspects of the present disclosure. The first apparatus may be implemented by a UE, such as the remote unit 105, the UE 205 and/or the user equipment apparatus 600, described above. The first apparatus includes a processor and a transceiver that receives a set of reference signals (e.g., downlink reference signals). The processor identifies a set of ports based on the set of reference signals and selects a subset of ports from the identified set of ports. The processor generates, based on the set of reference signals, an amplitude coefficient indicator and at least one phase coefficient indicator for each selected port. The processor generates a CSI report, where the CSI report consists of a Type-II port-selection codebook corresponding to the generated coefficients and the selected ports.

In some embodiments, the CSI report indicates a set of one or more of phase coefficient values for each of the selected ports. In some embodiments, the set of reference signals correspond to a plurality of transmission layers, where a different subset of the set of ports is selected for each transmission layer. In certain embodiments, the CSI report comprises a layer-specific selected subset of the set of ports.

In some embodiments, the port selection per layer is restricted to a set of consecutive ports. In certain embodiments, the port selection per layer is polarization-common. In one embodiment, the port selection per layer is indicated using a bitmap. In another embodiment, the port selection per layer is indicated using a combinatoric value.

In some embodiments, the indicated amplitude coefficient corresponds to a plurality of phase coefficients per port. In other embodiments, the indicated amplitude coefficient corresponds to one phase coefficient per port. In some embodiments, the CSI report includes only a wideband CQI value.

In some embodiments, the received set of reference signals are beamformed using a beamforming function. In such embodiments, the beamforming function is based on one or more channel characteristics comprising parameters corresponding to at least one of an angle of arrival value and a relative delay value for a set of different channel paths.

In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

Disclosed herein is a first method for Type-II port-selection codebook generation, in accordance with aspects of the present disclosure. The first method may be performed by a UE, such as the remote unit 105, the UE 205 and/or the user equipment apparatus 600, described above. The first method includes receiving a set of reference signals and identifying a set of ports based on the set of reference signals. The first method includes selecting a subset of ports from the identified set of ports and generating, based on the set of reference signals, an amplitude coefficient indicator and at least one phase coefficient indicator for each selected port. The first method includes generating a CSI report, where the CSI report consists of a Type-II port-selection codebook corresponding to the generated coefficients and the selected ports.

In some embodiments, the CSI report indicates a set of one or more of phase coefficient values for each of the selected ports. In some embodiments, the set of reference signals correspond to a plurality of transmission layers, where a different subset of the set of ports is selected for each transmission layer. In some embodiments, the CSI report comprises a layer-specific selected subset of the set of ports.

In certain embodiments, the port selection per layer is restricted to a set of consecutive ports. In certain embodiments, the port selection per layer is polarization-common. In one embodiment, the port selection per layer is indicated using a bitmap. In another embodiment, the port selection per layer is indicated using a combinatoric value.

In some embodiments, the indicated amplitude coefficient corresponds to a plurality of phase coefficients per port. In other embodiments, the indicated amplitude coefficient corresponds to one phase coefficient per port. In some embodiments, the CSI report includes only a wideband CQI value.

In some embodiments, the received set of reference signals are beamformed using a beamforming function. In such embodiments, the beamforming function is based on one or more channel characteristics comprising parameters corresponding to at least one of an angle of arrival value and a relative delay value for a set of different channel paths.

In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

Disclosed herein is a second apparatus for generating a beamforming matrix for each frequency index for Type-II port-selection codebook, in accordance with aspects of the present disclosure. The second apparatus may be implemented by a RAN node in a communication network, such as the base unit 121, the gNB 210, and/or the network apparatus 700, described above. The second apparatus includes a processor and a transceiver that receives a set of uplink reference signals. The processor identifies a set of channel characteristics based on the uplink reference signals, the set of channel characteristics comprising parameters corresponding to at least one of an angle of arrival value and a relative delay value for a set of different channel paths. The processor generates a set of downlink reference signals based on the channel characteristics inferred from the received set of uplink reference signals.

In some embodiments, the generated set of downlink reference signals are beamformed using a beamforming function. In such embodiments, the beamforming function is based on the set of channel characteristics. In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

Disclosed herein is a second method for generating a beamforming matrix for each frequency index for Type-II port-selection codebook, in accordance with aspects of the present disclosure. The second method may be performed by a RAN node in a communication network, such as the base unit 121, the gNB 210, and/or the network apparatus 700, described above. The second method includes receiving a set of uplink reference signals and identifying a set of channel characteristics based on the uplink reference signals, the set of channel characteristics comprising parameters corresponding to at least one of an angle of arrival value and a relative delay value for a set of different channel paths. The second method includes generating a set of downlink reference signals based on the channel characteristics inferred from the received set of uplink reference signals.

In some embodiments, the generated set of downlink reference signals are beamformed using a beamforming function. In such embodiments, the beamforming function is based on the set of channel characteristics. In one embodiment, columns of the beamforming function at a given frequency index are based on orthonormal columns drawn from a Fourier-based transform, where each of the columns is scaled by a distinct phase value. In another embodiment, columns of the beamforming function at a given frequency index are based on the parameters corresponding to at least one of an angle of arrival value and a relative delay value of a subset of the set of different channel paths.

Disclosed herein is a third apparatus for Type-II port-selection codebook generation, in accordance with aspects of the present disclosure. The third apparatus may be implemented by a UE, such as the remote unit 105, the UE 205 and/or the user equipment apparatus 600, described above. The third apparatus includes at least one processor coupled with at least one memory and configured to cause the third apparatus to: A) receive a set of CSI reference signals; B) identify a set of ports based on the set of CSI reference signals; C) select a subset of ports from the identified set of ports; D) generate a set of amplitude coefficient indicators and a set of phase coefficient indicators corresponding to the subset of ports; and E) generate a CSI report comprising an indication of the selection of the subset of ports, the set of amplitude coefficient indicators, and the set of phase coefficient indicators, where the selection of the subset of ports is indicated using a combinatoric value.

In some embodiments, the selection of the subset of ports is common for two polarizations corresponding to the channel. In some embodiments, each indicated amplitude coefficient corresponds to one phase coefficient per port.

In some embodiments, the combinatoric value corresponds to a joint function $C_L^{K/2}$ corresponding to a choice of the subset of ports per polarization of size L from the set of ports K. In certain embodiments, a number of bits used to indicate the combinatoric value is equivalent to $\lceil \log_2 C_L^{K/2} \rceil$ bits, where the expression $\lceil \cdot \rceil$ is a ceiling function and $\log_2$ is a logarithmic function of a base of value two.

In some embodiments, the CSI report corresponds to a Type-II port-selection codebook. In some embodiments, the CSI report indicates a set of one or more of phase coefficient values for each of the subset of CSI-RS ports.

In some embodiments, the set of CSI-RSs correspond to a plurality of transmission layers, where a different subset of the set of ports is selected for each transmission layer. In certain embodiments, the CSI report includes a transmission layer-specific selected subset of the set of ports. In further embodiments, the selection of the subset of ports per transmission layer is polarization-common.

Disclosed herein is a third method for Type-II port-selection codebook generation, in accordance with aspects of the present disclosure. The third method may be performed by a UE, such as the remote unit 105, the UE 205 and/or the user equipment apparatus 600, described above. The third method includes receiving receive a set of CSI reference signals and identifying a set of ports based on the set of CSI reference signals. The third method includes selecting a subset of ports from the identified set of ports and generating a set of amplitude coefficient indicators and a set of phase coefficient indicators corresponding to the subset of ports. The third method includes generating a CSI report comprising an indication of the selection of the subset of ports, the set of amplitude coefficient indicators, and the set of phase coefficient indicators, where the selection of the subset of ports is indicated using a combinatoric value.

Disclosed herein is a processor for wireless communication, in accordance with aspects of the present disclosure. The processor may be implemented within a UE, such as the remote unit 105, the UE 205 and/or the user equipment apparatus 600, described above. The processor includes at least one controller coupled with at least one memory and configured to cause the processor to: A) receive a set of CSI reference signals; B) identify a set of ports based on the set of CSI reference signals; C) select a subset of ports from the identified set of ports; D) generate a set of amplitude coefficient indicators and a set of phase coefficient indicators corresponding to the subset of ports; and E) generate a CSI report comprising an indication of the selection of the subset of ports, the set of amplitude coefficient indicators, and the set of phase coefficient indicators, where the selection of the subset of ports is indicated using a combinatoric value.

In some embodiments, the selection of the subset of ports is common for two polarizations corresponding to the channel. In some embodiments, each indicated amplitude coefficient corresponds to one phase coefficient per port.

In some embodiments, the combinatoric value corresponds to a joint function $C_L^{K/2}$ corresponding to a choice of the subset of ports per polarization of size L from the set of ports K. In certain embodiments, a number of bits used to indicate the combinatoric value is equivalent to $\lceil \log_2 C_L^{K/2} \rceil$ bits, where the expression $\lceil \cdot \rceil$ is a ceiling function and $\log_2$ is a logarithmic function of a base of value two.

In some embodiments, the CSI report corresponds to a Type-II port-selection codebook. In some embodiments, the CSI report indicates a set of one or more of phase coefficient values for each of the subset of CSI-RS ports.

In some embodiments, the set of CSI-RSs correspond to a plurality of transmission layers, where a different subset of the set of ports is selected for each transmission layer. In certain embodiments, the CSI report includes a transmission layer-specific selected subset of the set of ports. In further embodiments, the selection of the subset of ports per transmission layer is polarization-common.

In some embodiments, the selection of the subset of ports is common for two polarizations corresponding to the channel. In some embodiments, each indicated amplitude coefficient corresponds to one phase coefficient per port.

In some embodiments, the combinatoric value corresponds to a joint function $C_L^{K/2}$ corresponding to a choice of the subset of ports per polarization of size L from the set of ports K. In certain embodiments, a number of bits used to indicate the combinatoric value is equivalent to $\lceil \log_2 C_L^{K/2} \rceil$ bits, where the expression $\lceil \cdot \rceil$ is a ceiling function and $\log_2$ is a logarithmic function of a base of value two.

In some embodiments, the CSI report corresponds to a Type-II port-selection codebook. In some embodiments, the CSI report indicates a set of one or more of phase coefficient values for each of the subset of CSI-RS ports.

In some embodiments, the set of CSI-RSs correspond to a plurality of transmission layers, where a different subset of the set of ports is selected for each transmission layer. In certain embodiments, the CSI report includes a transmission layer-specific selected subset of the set of ports. In further embodiments, selecting the subset of ports comprises performing a polarization-common selection of the subset of ports per transmission layer.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
   at least one memory; and
   at least one processor coupled with the at least one memory and configured to cause the UE to:
   receive a set of Channel State Information (CSI) reference signals;
   identify a set of ports based on the set of CSI reference signals;
   select a subset of ports from the identified set of ports;
   generate a set of amplitude coefficient indicators and a set of phase coefficient indicators corresponding to the subset of ports; and
   generate a CSI report comprising an indication of the subset of ports, the set of amplitude coefficient indicators, and the set of phase coefficient indicators, wherein the indication of the subset of ports comprises a combinatoric value.

2. The UE of claim 1, wherein the selection of the subset of ports is common for two polarizations corresponding to a channel.

3. The UE of claim 1, wherein the combinatoric value corresponds to a joint function $C_L^{K/2}$ corresponding to a choice of the subset of ports per polarization of size L from the set of ports K.

4. The UE of claim 3, wherein a number of bits used to indicate the combinatoric value is equivalent to $\lceil \log_2 C_L^{K/2} \rceil$ bits, wherein the expression $\lceil \cdot \rceil$ is a ceiling function and $\log_2$ is a logarithmic function of a base of value two.

5. The UE of claim 1, wherein the CSI report corresponds to a Type-II port-selection codebook.

6. The UE of claim 1, wherein the CSI report indicates a set of one or more of phase coefficient values for each of the subset of ports.

7. The UE of claim 1, wherein the set of CSI-RSs correspond to a plurality of transmission layers, wherein a different subset of the set of ports is selected for each transmission layer.

8. The UE of claim 7, wherein the CSI report comprises a transmission layer-specific selected subset of the set of ports.

9. The UE of claim 8, wherein the selection of the subset of ports per transmission layer is polarization-common.

10. The UE of claim 1, wherein each indicated amplitude coefficient corresponds to one phase coefficient per port.

11. A processor for wireless communication, comprising:
    at least one controller coupled with at least one memory and configured to cause the processor to:
    receive a set of Channel State Information (CSI) reference signals;
    identify a set of ports based on the set of CSI reference signals;
    select a subset of ports from the identified set of ports;
    generate a set of amplitude coefficient indicators and a set of phase coefficient indicators corresponding to the subset of ports; and
    generate a CSI report comprising an indication of the selection of the subset of ports, the set of amplitude coefficient indicators, and the set of phase coefficient indicators, wherein the selection of the subset of ports is indicated using a combinatoric value.

12. The processor of claim 11, wherein the selection of the subset of ports is common for two polarizations corresponding to a channel.

13. The processor of claim 11, wherein the combinatoric value corresponds to a joint function $C_L^{K/2}$ corresponding to a choice of the subset of ports per polarization of size L from the set of ports K.

14. The processor of claim 13, wherein a number of bits used to indicate the combinatoric value is equivalent to $\lceil \log_2 C_L^{K/2} \rceil$ bits, wherein the expression $\lceil \cdot \rceil$ is a ceiling function and $\log_2$ is a logarithmic function of a base of value two.

15. The processor of claim 11, wherein the CSI report corresponds to a Type-II port-selection codebook.

16. The processor of claim 11, wherein the CSI report indicates a set of one or more of phase coefficient values for each of the subset of ports.

17. The processor of claim 11, wherein the set of CSI-RSs corresponds to a plurality of transmission layers, wherein a different subset of the set of ports is selected for each transmission layer.

18. The processor of claim 17, wherein the CSI report comprises a transmission layer-specific selected subset of the set of ports.

19. The processor of claim 18, wherein the selection of the subset of ports per transmission layer is polarization-common.

20. The processor of claim 11, wherein each indicated amplitude coefficient corresponds to one phase coefficient per port.

* * * * *